(12) United States Patent
Caumont et al.

(10) Patent No.: US 8,968,919 B2
(45) Date of Patent: Mar. 3, 2015

(54) ELECTRICAL ENERGY STORAGE SYSTEM WITH BONDINGING ELEMENT AND POSITIONING GASKET SEALING LID TO ENVELOPE

(75) Inventors: Olivier Caumont, Quimper (FR); René Huibant, Scaer (FR); Jean-François Minard, Gonarivan (FR)

(73) Assignee: Blue Solutions, Ergue Gaberic (FR)

( * ) Notice: Subject to any disclaimer, the term of this patent is extended or adjusted under 35 U.S.C. 154(b) by 1546 days.

(21) Appl. No.: 12/086,227

(22) PCT Filed: Oct. 9, 2006

(86) PCT No.: PCT/EP2006/067210
§ 371 (c)(1),
(2), (4) Date: Sep. 30, 2009

(87) PCT Pub. No.: WO2007/065748
PCT Pub. Date: Jun. 14, 2007

(65) Prior Publication Data
US 2012/0114989 A1    May 10, 2012

(30) Foreign Application Priority Data
Dec. 5, 2005   (FR) ..................................... 05 12319

(51) Int. Cl.
*H01M 2/02*   (2006.01)
*H01M 2/04*   (2006.01)
(Continued)

(52) U.S. Cl.
CPC . *H01G 9/10* (2013.01); *H01M 2/04* (2013.01); *H01M 2/20* (2013.01); *H01M 10/0431* (2013.01); *Y02E 60/13* (2013.01)
USPC ........... 429/174; 429/158; 429/164; 429/170; 429/185; 361/518; 361/519; 361/520; 361/521; 361/522

(58) Field of Classification Search
USPC ........... 429/61, 158, 164, 174, 178, 181, 184; 361/518, 519, 520, 521, 522
See application file for complete search history.

(56) References Cited

U.S. PATENT DOCUMENTS 3,243,673 A * 3/1966 Leach ......................... 361/274.1
3,762,965 A * 10/1973 Amin et al. ..................... 148/24
(Continued)

FOREIGN PATENT DOCUMENTS

DE   1 281 581 B    10/1968
DE   41 14 756 A1   12/1992
(Continued)

OTHER PUBLICATIONS

Kimura et al., Machine translation of JP 11-176697 A, Jul. 1999.*

*Primary Examiner* — Sean P Cullen
(74) *Attorney, Agent, or Firm* — Blakely Sokoloff Taylor & Zafman

(57) ABSTRACT

The invention relates to an electrical energy storage system (100) comprising at least one coiled electrical energy storage element placed inside an envelope (200), said envelope (200) containing the coiled electrical energy storage element in a main body (210) of the envelope (200) and including at least one lid (230, 240), characterized in that said lid (230, 240), placed at one end of the main body of the envelope (200) and electrically connected by electrical connection means (280) to the coiled electrical energy storage element, is fastened to the main body (210) of the envelope (200) by a bonding means (600). The invention is particularly applicable in the production of electrical energy storage assemblies such as supercapacitors, batteries or generators.

34 Claims, 8 Drawing Sheets

(51) Int. Cl.
*H01M 2/08* (2006.01)
*H01M 2/22* (2006.01)
*H01G 9/08* (2006.01)
*H01G 9/10* (2006.01)
*H01G 9/12* (2006.01)
*H01M 2/20* (2006.01)
*H01M 10/04* (2006.01)

(56) References Cited

U.S. PATENT DOCUMENTS

| | | | |
|---|---|---|---|
| 4,256,815 A * | 3/1981 | Smilanich et al. | 429/185 |
| 5,580,358 A * | 12/1996 | Narusawa et al. | 29/25.03 |
| 5,680,290 A * | 10/1997 | Akai et al. | 361/275.4 |
| 6,251,536 B1 * | 6/2001 | Janmey | 429/176 |
| 6,366,446 B1 | 4/2002 | Schweikert et al. | |
| 2003/0118892 A1 * | 6/2003 | Ray et al. | 429/82 |
| 2003/0148179 A1 * | 8/2003 | Uyama et al. | 429/185 |
| 2004/0157115 A1 * | 8/2004 | Bouffard et al. | 429/56 |
| 2005/0244706 A1 * | 11/2005 | Wu et al. | 429/56 |
| 2006/0146480 A1 * | 7/2006 | Thrap | 361/522 |
| 2006/0156521 A1 * | 7/2006 | Miura et al. | 29/25.03 |

FOREIGN PATENT DOCUMENTS

| | | | |
|---|---|---|---|
| GB | 846 083 A | | 8/1960 |
| JP | 11176697 A | * | 7/1999 |

* cited by examiner

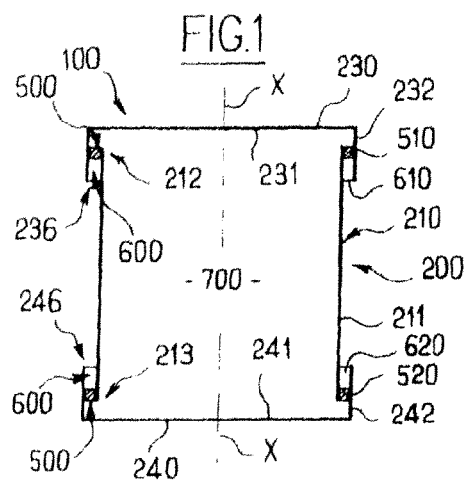
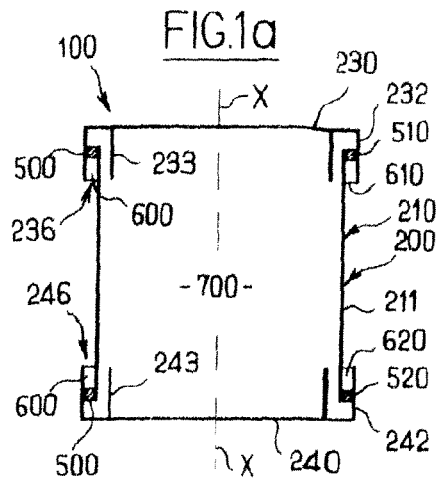
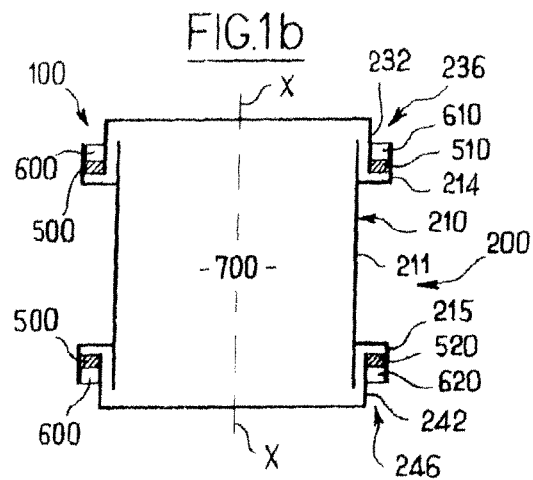
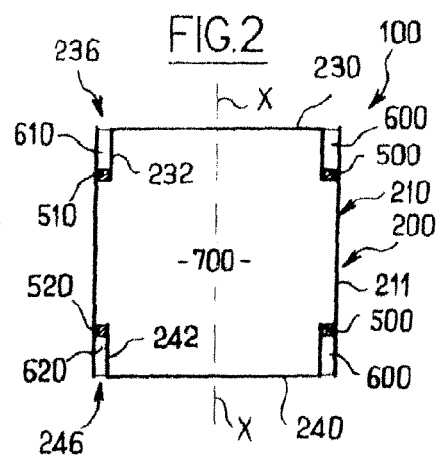
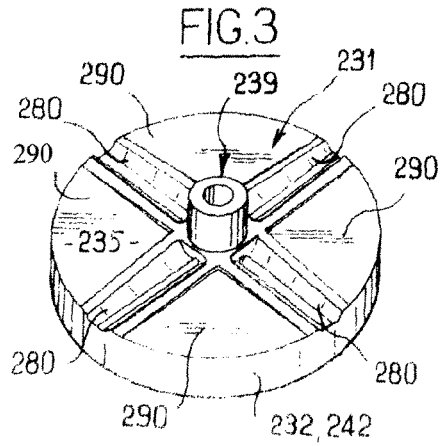
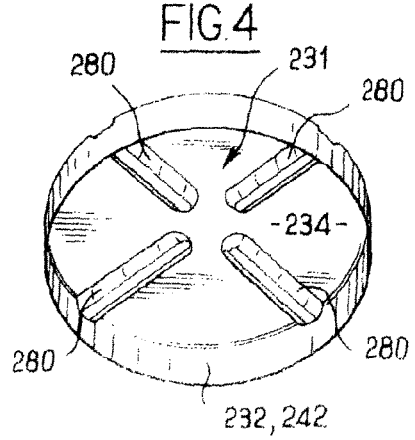

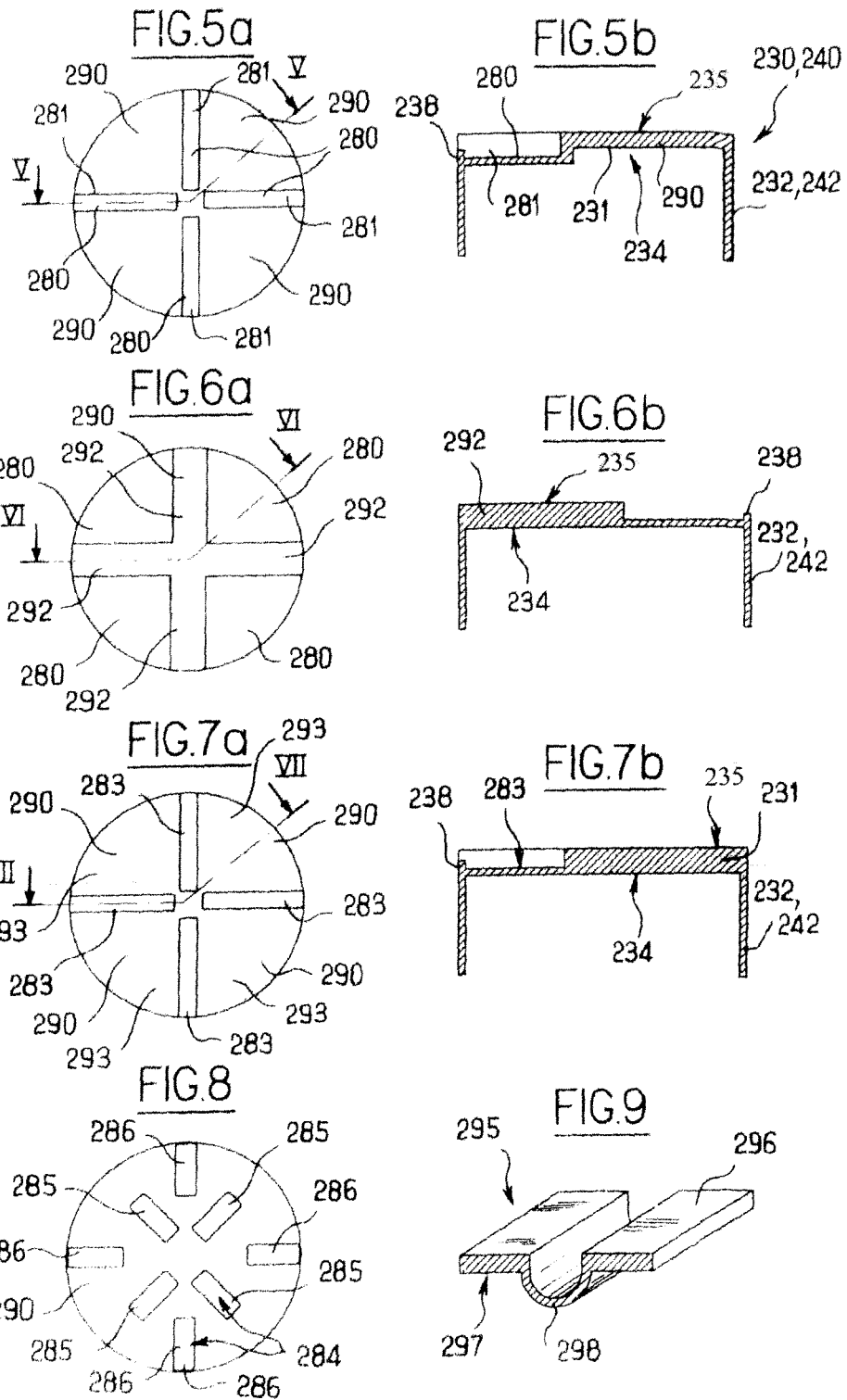

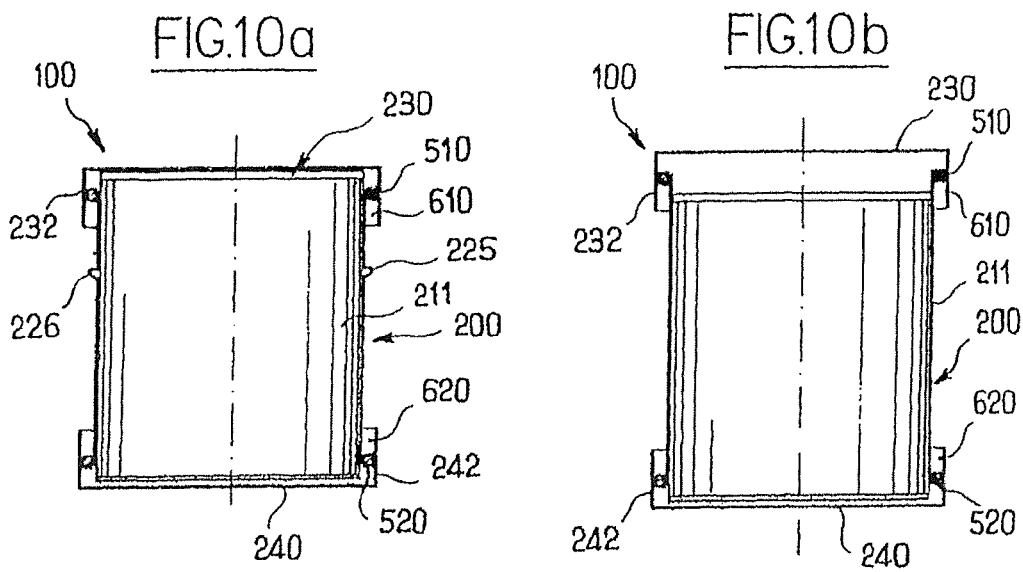
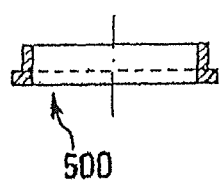
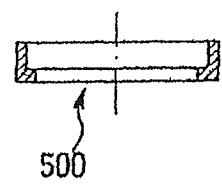
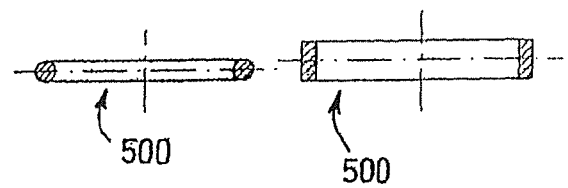
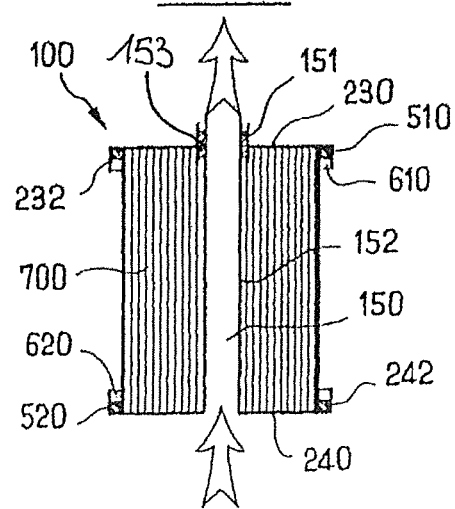

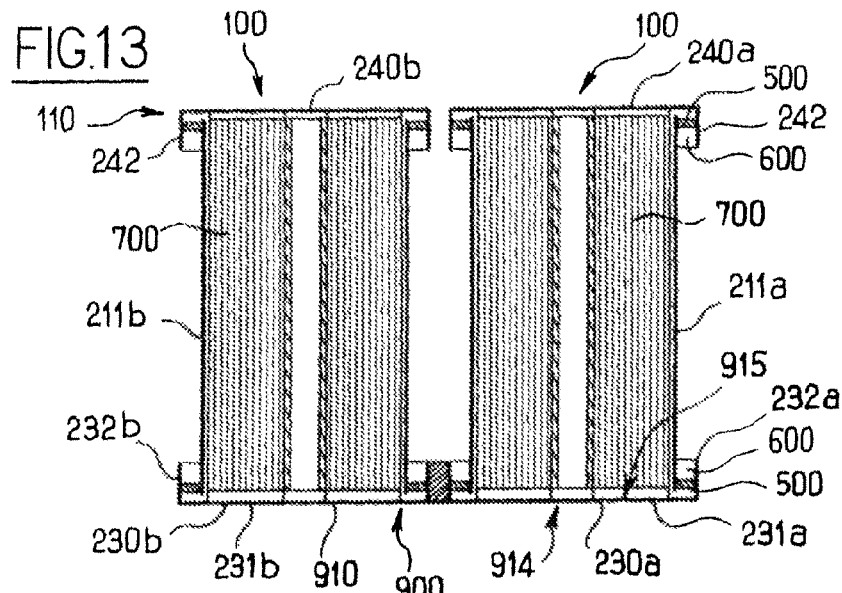
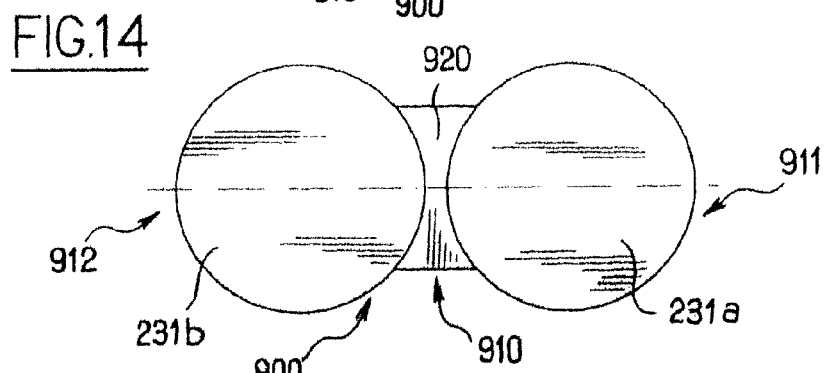
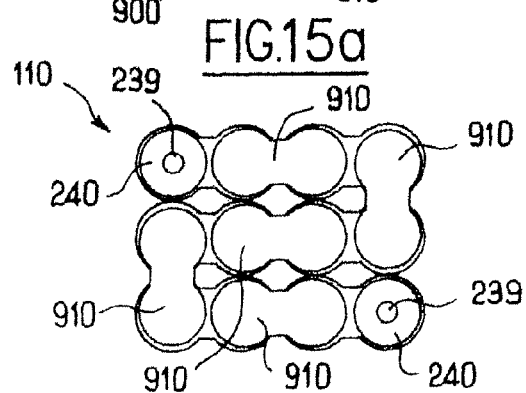
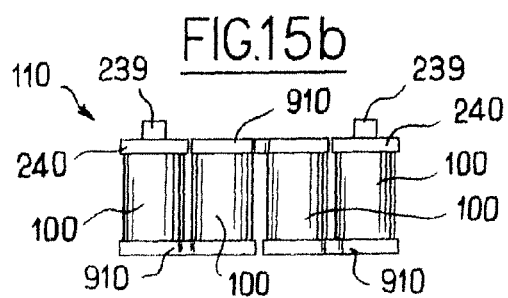

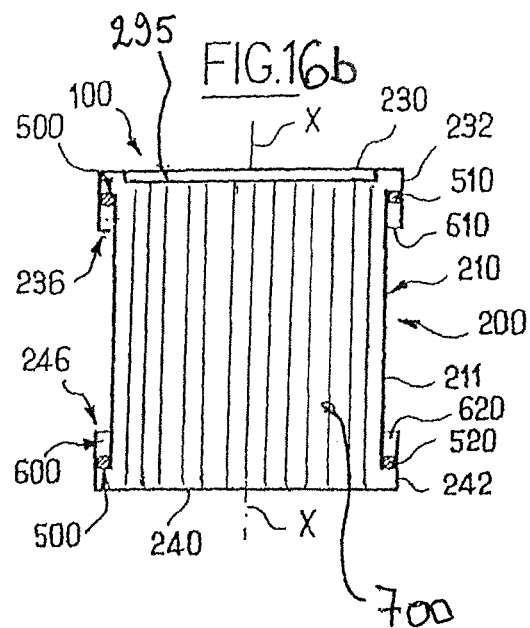
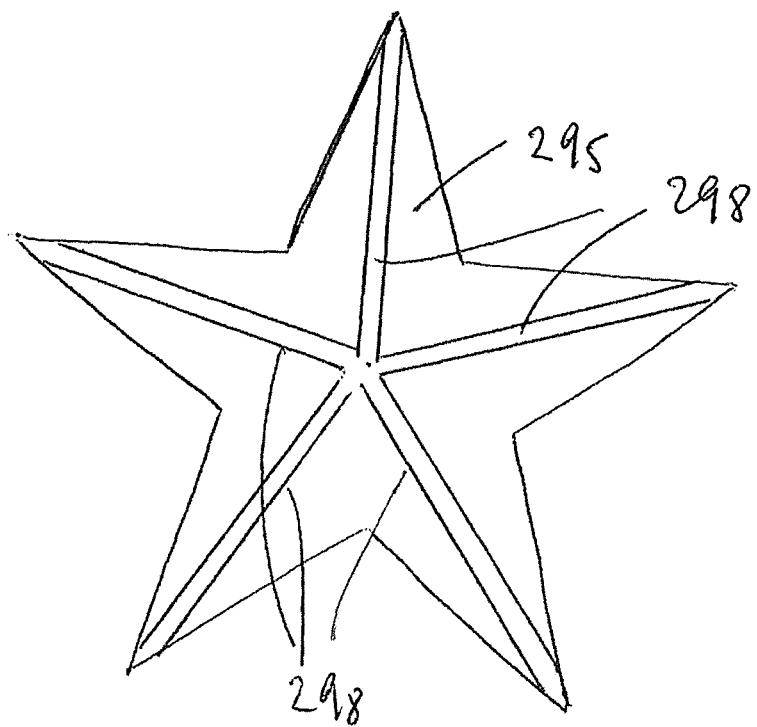

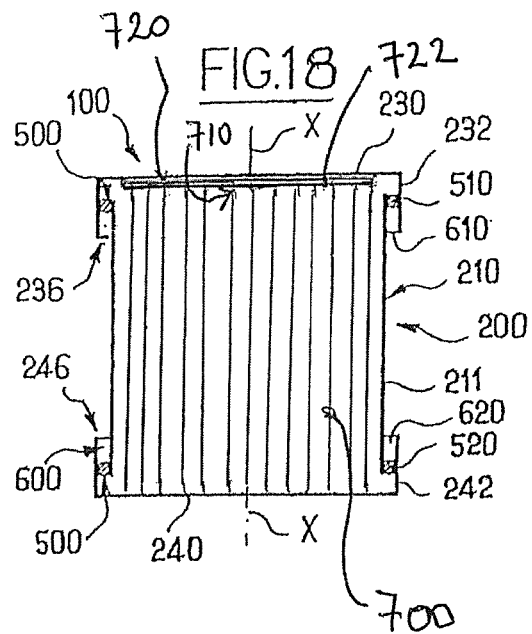
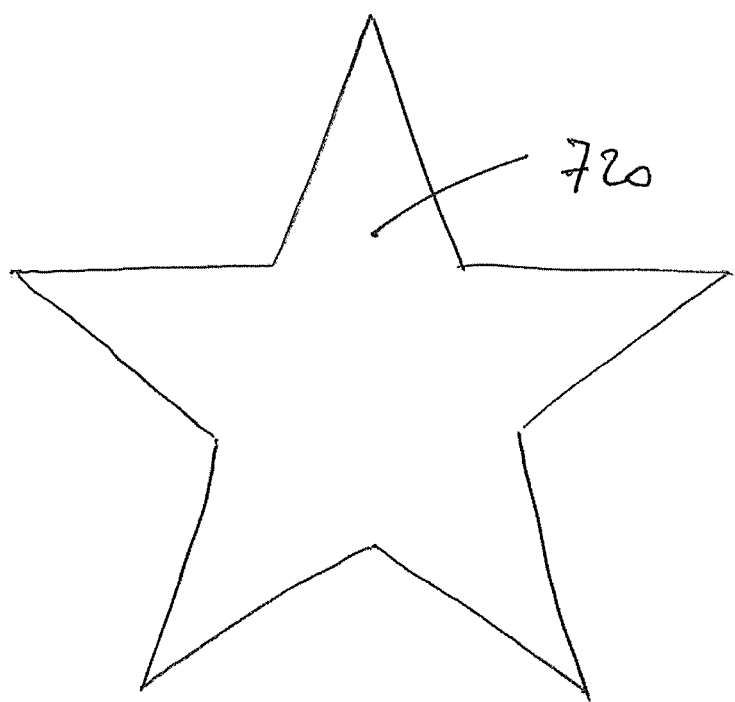

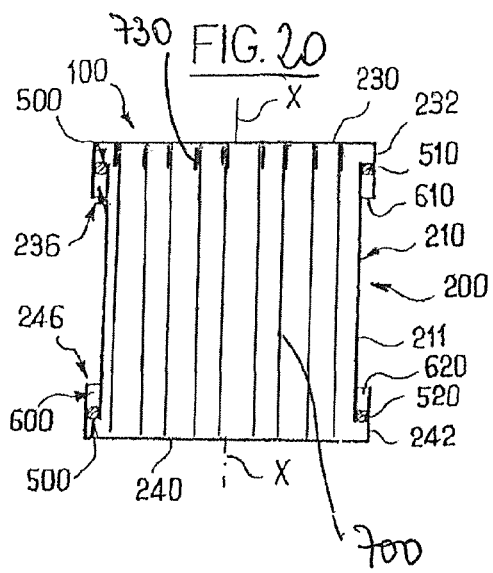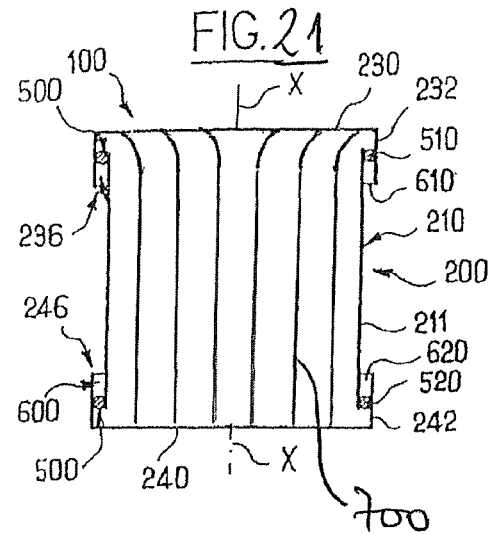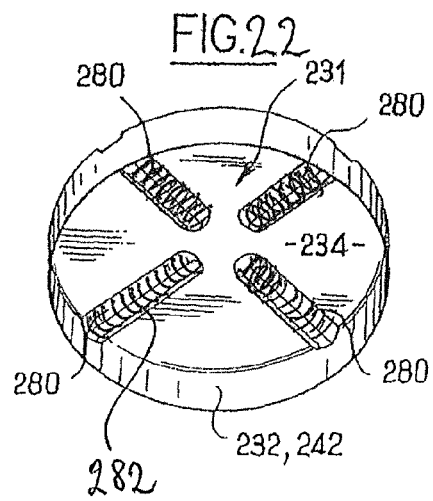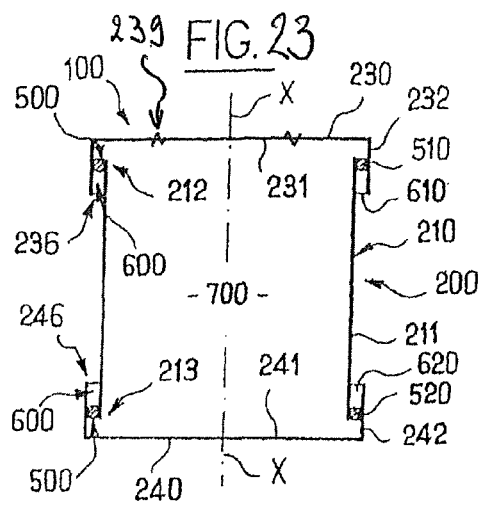

ELECTRICAL ENERGY STORAGE SYSTEM WITH BONDINGING ELEMENT AND POSITIONING GASKET SEALING LID TO ENVELOPE

—The present patent application is a non-provisional of International Application No. PCT/EP2006/067210 filed Oct. 9, 2006—

FIELD OF THE INVENTION

The invention relates to assemblies for the storage of electrical energy. It applies, in particular, but not in a limited way, to supercapacitors, capacitors, and generators or batteries. More precisely, the present invention relates to the sealing and the electrical connection of an assembly for the storage of electrical energy.

PRESENTATION OF THE PRIOR ART

A large number of electrical energy storage assemblies, so-called of the high-power type, have recently been proposed, such as supercapacitors for example.

However, the known devices are not totally satisfactory in terms of their sealing and their power connections.

Conventionally, a supercapacitor includes a coiled element composed of a stack of leaves or sheets (anode, collector, anode, separator, cathode, collector, cathode, separator) wound onto itself, with one of these leaves projecting at each end, known as a current collector. This coiled element is placed in an envelope that includes a main body that is closed off at least at one of its two ends by a lid.

According to the prior art, in order to create such an electrical energy storage system, the lid is attached to the main body of the envelope by a mechanical assembly, by crimping, bolting or rolling, for example (turning back the edge of the main body onto the lid to compress a sealing gasket provided between the two).

In addition, mention will also be made of the regular use of electrical connection elements in order to create the electrical connection, within the main body of the envelope, between each lid equipped with an electrical connection terminal and the coiled element.

As the electrical connection element, some designs use the current collector projecting from the coiled element and cut to form one or more stacks of current collecting tabs, with these tabs then being connected to the electrical connection terminal of the lid.

However, these embodiments are complex and lead to very bulky electrical energy storage assemblies.

Furthermore, the current is not distributed uniformly in the coiled element due to the fact that all the turns are not connected to the electrical connection terminal. This characteristic encourages concentrations of ions and electrons in some turns to the detriment of others, thus leading to:
- an increase in the series resistance, which has negative effects on the performance of the energy storage element (reduction in the energy and the power available),
- heating which is favoured by poor removal of the internal heat by the current collectors, and
- localisation or even acceleration of ageing in the energy storage element.

Other embodiments therefore propose welding, by a transparency laser technique, of an intermediate electrical connecting part provided between the coiled element and each of the lids.

However, these designs are complex, because of a large increase in the operations to be performed. Moreover, the presence of this intermediate part complicates the design of the electrical energy storage system in terms of mass.

It is possible to also mention a design for an electrical energy storage system in which the coiled element is directly flattened and welded against the lids in order to optimise the volume of the whole.

In this case however, the mechanical closures of the lids prevent the weld zones present on the lids to come into contact with all the turns of the coiled element and then also limit the quantity of welded turns.

Furthermore, all these embodiments of supercapacitors have as a common feature that they possess sealing faults.

In fact, the ageing of these assemblies of the supercapacitor type lead to the generation of gas in the envelope of the electrical energy storage element that results in a rise in the pressure within the envelope.

The conventional closures by rolling or by bolting of the lids onto the main body of the envelope are not designed to resist this pressure increase and give rise to a loss of sealing in the electrical energy storage system, sometimes resulting in leakages of solvent, or even in the worst cases, in abrupt rupture.

In addition, at the present time, during their mounting in a module, these mechanical electrical energy storage assemblies require the addition of an electrical connection element between each pair of neighbouring assemblies with a view to connecting them electrically.

In some designs, these parts, of the rigid or flexible strap, braid or stack of sheets type, are screwed onto each of the respective electrical connection terminals of a pair of electrical energy storage assemblies.

These module designs often require costly treatment of the parts, such as tin or nickel plating, in order to ensure optimal electrical contact when bolted.

Other embodiments include the welding of these parts. But the temperature rises created by the welding often limit its execution on non-finished elements and lead most of the time to the assembly of modules before the electrolyte filling step, which greatly complicates the production method.

The creation of these module assemblies by the addition of connector parts is lengthy and complex.

The aim of the invention is particularly to overcome the drawbacks of the prior art.

Another aim of the present invention is to propose a system for the electrical energy storage having a configuration that is easy to perform, while also offering simple and secure electrical connection.

Another aim of the present invention is to propose a system for the electrical energy storage having a sealing system which is reliable over time, resistant to very high internal pressures, and whose adjustable sealing performance can cope with values below $10^{-9}$ mbar·l·s$^{-1}$.

It is also desirable to propose systems for the electrical energy storage that offer a saving in terms of cost, weight, space, and production time.

Another aim of the present invention is to propose a system for the electrical energy storage that facilitates its association with other similar systems so as to form an electrical energy storage module.

SUMMARY OF THE INVENTION

These aims are attained, according to the invention, by virtue of a system for the electrical energy storage including at least one coiled electrical energy storage element placed within an envelope, the said envelope enclosing the coiled electrical energy storage element in a main body of the envelope, and including at least one lid, characterised in that the said lid, placed at one end of the main body of the envelope and connected electrically by electrical link means to the coiled electrical energy storage element, is attached to the main body of the envelope by bonding means.

According to another advantageous characteristic of the invention, the bonding element is placed so as to cover a positioning gasket inserted between the main body of the envelope and the lid.

According to another advantageous characteristic of the invention, the positioning gasket and the bonding element are provided in an annular channel formed by the main body of the envelope and a small collar present on the said lid.

According to another advantageous characteristic of the invention, at least two electrical energy storage systems according to the invention form an electrical energy storage module by using a single electrically conducting part with two or more lids, made from various materials or attached by assembly, which respectively enclose spooled elements for the storage of electrical energy provided in juxtaposed main envelope bodies.

BRIEF DESCRIPTION OF THE FIGURES

The invention will be understood more clearly, and other advantages and characteristics will appear, on reading the description that follows, and which is given by way of non-limiting examples, and by means of the appended drawings in which:

FIG. 1 illustrates a view in longitudinal section of a system for the storage of electrical energy according to the invention;

FIG. 1a represents a similar view in section of a variant whose lids have a double small collar;

FIG. 1b represents a view in longitudinal section of another variant whose main envelope body forms double small collars in order to hold the lids;

FIG. 2 illustrates a view in longitudinal section of another variant of FIG. 1;

FIG. 3 illustrates a view in perspective of the top of a lid of a system for the storage of electrical energy according to the invention;

FIG. 4 illustrates a view in perspective of the bottom of a lid of a system for the storage of electrical energy according to the invention;

FIG. 5a illustrates a top view of a lid of an electrical energy storage system according to the invention equipped with electrical connection means, while FIG. 5b illustrates the same lid according to a longitudinal section passing through the half-sectional planes referenced V-V in FIG. 5a;

FIG. 6a illustrates a top view of a variant of the lid of an electrical energy storage system according to the invention, equipped with electrical connection means, while FIG. 6b illustrates the same lid according to a longitudinal section passing through the half-sectional planes referenced VI-VI in FIG. 6a;

FIG. 7a illustrates a top view of another variant of the lid of an electrical energy storage system according to the invention, equipped with electrical connection means, while FIG. 7b illustrates the same lid according to a longitudinal section passing through the half-sectional planes referenced VII-VII in FIG. 7a;

FIG. 8 illustrates a top view of a lid according to another variant of the invention;

FIG. 9 illustrates a view in longitudinal section of a small connecting strap according to the invention;

FIGS. 10a and 10b illustrate, in longitudinal section, an embodiment variant of an electrical energy storage system according to the present invention, in which the main envelope body is equipped with an expansion bellows, respectively in the rest position in FIG. 10a and after extension of the bellows in FIG. 10b;

FIGS. 11a, 11b, 11c and 11d illustrate views in section of four variants of positioning gaskets;

FIG. 13 illustrates a view in longitudinal section of an electrical energy storage module according to the invention created using two systems combined;

FIG. 14 illustrates a top view of the twin-lidded part of an electrical energy storage module according to the invention;

FIGS. 15a and 15b respectively show a top view and a side view of an electrical energy storage module according to the invention, created using a larger number of associated systems; and FIG. 16a shows longitudinal view of a variant of the system for the storage of energy according to the invention, which includes a central tubular canal allowing the passage of a heat-bearing fluid for use in thermal regulation of the system.

FIG. 17 shows the electrical energy connection strap in the form of a star.

FIG. 18 shows a plurality of layers of conducting metal sheeting, covering at least the surface of the lid/current-collecting element connection strips.

FIG. 19 shows a metal sheeting in form of a star.

FIG. 20 shows a material on current collecting elements of the coiled element.

FIG. 21 shows a radial layering of the current collecting elements.

FIG. 22 shows a layer of adhesive resin over all of a surface of the connection welding strips.

FIG. 23 shows bellows placed on the lid.

DETAILED DESCRIPTION OF THE INVENTION

Figure 12:
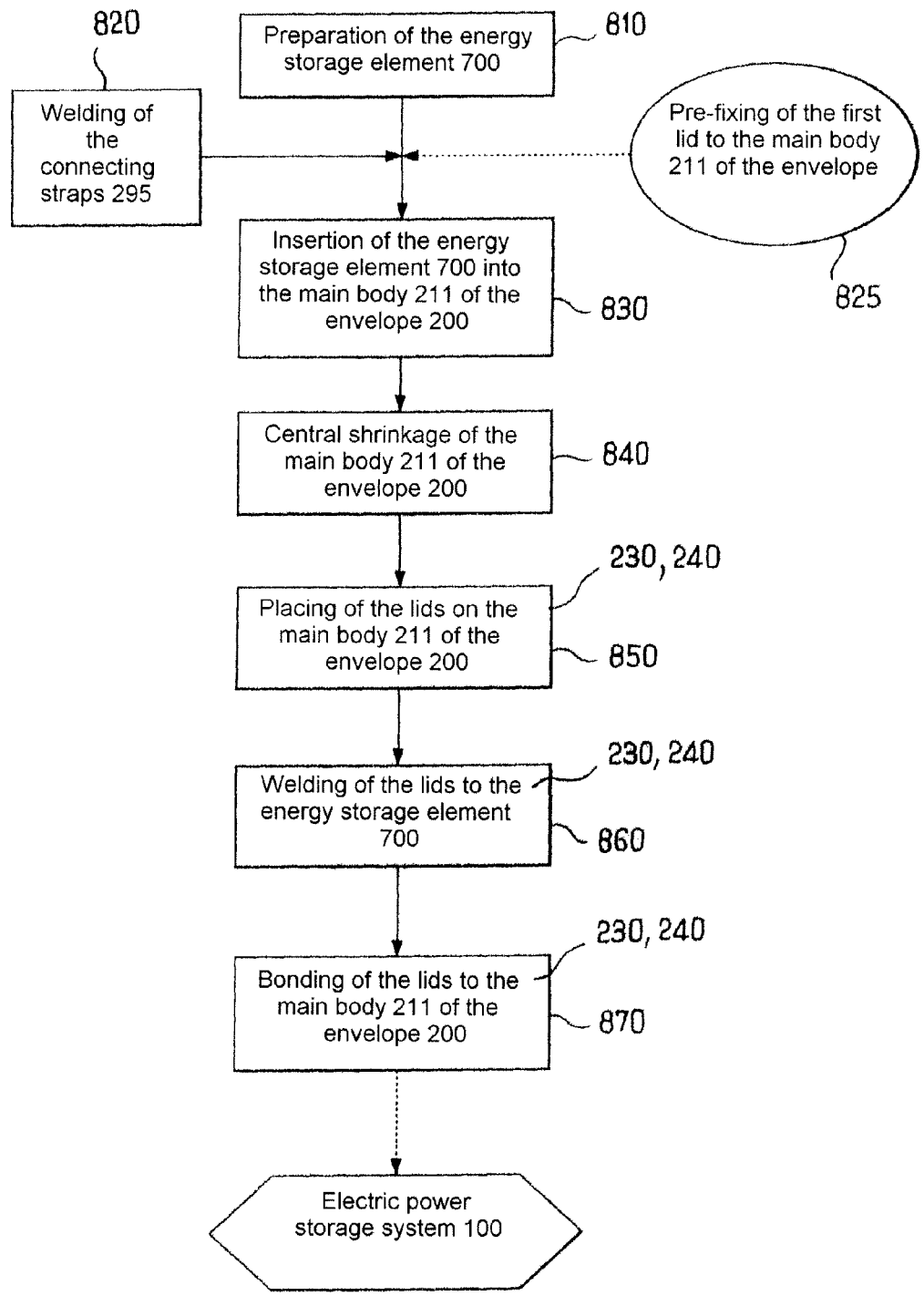
FIG. 12 shows a block diagram of the different steps of a method for the embodiment of an electrical energy storage system according to the invention.

FIG. 1 illustrates an electrical energy storage system 100 according to the invention.

An electrical energy storage system 100 includes an envelope 200 formed of a main body 210 receiving a coiled electrical energy storage element, and of two lids 230 and 240 closing off the main body 210 of the envelope 200 at its two ends. It also includes, on the lids 230 and 240, electrical connection means 280 (see FIG. 3) intended to provide an electrical link between the lids 230, 240 and the said coiled element.

The main body 210 of the envelope 200 comes in the form of a cylinder 211, open at its two ends 212 and 213 and centred on axis X-X.

This cylinder 211 is advantageously rigid and light.

It is preferably made of aluminium, and its thickness is between 0.4 and 1 mm.

According to an embodiment variant of the electrical energy storage system, the cylinder 211 is in a plastic material.

Furthermore, this cylinder 211 has an internal diameter and a length to suit the coiled electrical energy storage element that it contains.

However, an embodiment variant provides for a cylinder length that is smaller than that of the coiled electrical energy storage element, so as to put the latter under pressure during the closure of the main body 210 of the envelope 200 by the two lids 230 and 240.

The coiled element placed in the main body 210 of the envelope 200 can be the subject of many embodiment variants. It will therefore not be described in detail in what follows. Neither is it illustrated in detail in the appended figures. However it is represented in FIG. 1 under the reference 700.

In one embodiment of the invention, the coiled electrical energy storage element is a cylindrical roll centred on axis X-X.

It is formed, in a manner which itself is familiar, of a stack of leaves or sheets (anode, collector, anode, separator, cathode, collector, cathode, separator) wound around a central axis that coincides, after assembly, with axis X-X, with or without the presence of a solid central support and in which one of the leaves comprising the stack, called the current collector, projects at each end.

In fact, the coiled electrical energy storage element is bordered respectively at both of its opposite ends by two current collecting elements, in spiral form.

The latter are intended to be connected to the electrical connection means 280 of the two lids 230 and 240 that cover them, as will be described later in relation to FIGS. 3 to 9 in particular.

In addition, the two electrically conducting lids 230 and 240 each respectively come in the form of an electrical connection disk 231 and 241, placed perpendicularly to axis X-X.

Each of these disks 231 and 241 includes, respectively, along its outer periphery, a small collar 232, 242, formed of a cylindrical skirt centred on axis X-X.

Each of the lids 230, 240 is preferably rigid and made of aluminium.

The thickness of each of the electrical connection disks 231 and 241 is designed, in a manner which itself is familiar, to provide a section for the passage of current that is sufficient as a function of the radius of the disks 231 and 241.

Furthermore, in the embodiment variant of the invention of FIG. 1, the external diameter of each of the electrical connection disks 231 and 241 is greater than the external diameter of the cylinder 211

Thus, the small collars 232 and 242 are placed on the outside of the external wall of the cylinder 211. As a result, the latter and the internal wall of each of the small collars 232 and 242 of the lids 230 and 240 placed on the opposite ends 212 and 213 of the cylinder 211 respectively form two annular channels 236 and 246, outside the main body of the envelope 200.

In a preferred embodiment of the invention, in order to position and fix each of the lids 230 and 240 to the two ends 212 and 213 of the cylinder 211, use is made of a system that basically includes a positioning gasket 500 and a bonding element 600.

In the embodiment variant illustrated in FIG. 1, two annular positioning gaskets 510 and 520, are fitted tightly on the cylinder 211 at its two ends 212 and 213 and, more precisely, in the annular channels 236 and 246.

These gaskets 510 and 520 have as their primary role to provide the electrical insulation between the main body 210 of the envelope 200 housing the coiled electrical energy storage element and each of the two lids 230 and 240.

Thus they are preferably made of an electrically non-conducting material, of the polytetrafluoroethylene (PTFE) type for example, glass loaded or not, or of plastic, of the type of polyphenylene sold under the trademark Ryton®.

The second role of the gaskets 510 and 520 is that of support for the bonding element 600, before and during its curing process, preventing the latter from running into the cylinder 211 in order to avoid damaging the coiled electrical energy storage element.

Thus, as illustrated in FIG. 11a, the positioning gaskets 510 and 520 can be of rectangular cross section.

However, as illustrated in FIGS. 11b, 11c and 11d, the positioning gaskets 510 and 520 can be the subject of many embodiment variants with, for example, cross sections that are respectively circular (FIG. 11b), L-shaped with the inside of the L facing generally and radially inwards, that is toward the main body 210 of the envelope 200 (FIG. 11c) or vice versa (FIG. 11d).

The positioning gaskets 510 and 520 are thus covered, respectively, in the annular channels 236 and 246 by a bonding element 610 and 620 in order to affix the main body 210 of the envelope 200 to each of the lids 230 and 240. By "covered" is meant, in the context of the present description, the fact that the bonding element 610 and 620 are placed on the outside of the positioning gaskets 510 and 520 in relation to the conducting path of the internal volume of the cylinder 211, on the outside of the latter, passing through the passage formed between the cylinder 211 and the lids 230 and 240.

The height, considered parallel to axis X-X, of the bonding element 610 and 620 deposited over all the circumference of the annular channels 236 and 246, in contact with each of the lids 230 and 240 and the cylinder 211, is adapted so as not to project beyond the height of each of the small collars 232 and 242 of the lids 230 and 240.

Furthermore, the adjustable height of the bonding element 610 and 620 provides a variable seal for the electrical energy storage system 100. In fact, a large bonding height increases the strength of the system 100 in relation to the high internal pressure of the main body 210 of the envelope 200 and resists the opening of the envelope 200 under the effect of this pressure.

Typically, the seal achieved by the bonding element according to the present invention, between the cylinder 211 and the lids 230 and 240 of a supercapacitor, can attain very low values, even below $10^{-9}$ mbar·l·s$^{-1}$. These values are very clearly below those commonly encountered with the commercially available products. This excellent level of seal achieved by bonding prevent the penetration of oxygen or of water into the supercapacitor, the result of which would be acceleration of the ageing process and therefore a reduction of the life expectancy of the product.

Advantageously, these bonding elements 610 and 620 are an adhesive compound that is both gas and water proof, and electrically insulating, of the heat-cured epoxy type.

The latter is preferably suitable for the fixing of aluminium to aluminium, such as an adhesive sold under the trademark DELO Monopox 1196 by DELO Industrial Adhesives LLC.

In an embodiment variant of the invention in which the cylinder 211 is in plastic, the adhesive will be specific to plastic/aluminium bonding.

Furthermore, each positioning gasket 510 and 520 must be resistant to the curing temperature of the adhesive used, as well as to any solvent that will be used in the coiled electrical energy storage element.

The positioning gaskets 510 and 520 also advantageously have an external surface that is sufficiently smooth to provide the two lids 230 and 240 with a slight latitude of movement in relation to the cylinder 211, in order to allow easy installation of the latter on the cylinder 211.

This latitude of movement is used to provide some play which allows pressurisation to be applied during the electrical connection of the coiled electrical energy storage element to the lids 230 and 240, as will be described later in relation to FIGS. 3 to 8.

FIG. 2 illustrates an embodiment variant of FIG. 1.

It proposes two lids 230 and 240, each with electrical connection disks 231 and 241 with an external diameter that is less than that of the cylinder 211.

In this case, the small collars 232 and 242 are placed within the cylinder 211.

Each of the annular channels 236 and 246, formed by the external faces of the small collars 232 and 242 and the internal wall of the cylinder 211, is then created within the cylinder 211.

In this case, each positioning gasket 510 and 520 is respectively fitted tightly on the lids 230 and 240, and more precisely on the small collars 232 and 242, within the cylinder 211, with a smooth external surface to allow the cylinder 211 a slight latitude of movement in relation to each of the lids 230 and 240.

In a manner similar to FIG. 1, each positioning gasket 510 and 520 is respectively covered by a bonding element 610 and 620 in the annular channels 236 and 246 in order to fix the main body 210 of the envelope 200 to each of the lids 230 and 240.

Another embodiment variant of an electrical energy storage system 100 proposes to replace each of the aforementioned positioning gaskets 510 and 520 by a certain thickness of a layer of the elastomer or plastic type on the outer wall of the cylinder 211 or of the small collars 232 and 242 of the lids 230 and 240.

Such a layer acting as a positioning gasket, extends along the main body 210 of the envelope 200, at a height that is suitable for that of the small collars 232 and 242.

In the variant of FIG. 1a, each lid 230 and 240 has a double small collar 232, 233 and 242, 243, which forms a channel 236, 246 in which is placed one end of the cylinder 211 with a positioning gasket 510, 520 at the bottom of the channel, and a bonding element 600 according to the invention between the joint and the outside of the channel.

In another variant, illustrated in FIG. 1b, it is the cylinder 211 that has an additional small external collar, referenced 214, 215, at each of its ends. Together with the end of the cylinder 211, the latter forms a channel 236, 246 in which is placed the small collar 232, 242 of a lid 230, 20 with, a positioning gasket 510, 520 at the bottom of channel and a bonding element 600 according to the invention between the joint and the outside of the channel.

Several configurations of the lids 230 and 240 capable of closing off the envelope 200 containing the coiled electrical energy storage element will now be described in relation to FIGS. 3 to 8.

In general, each lid 230 or 240 has an electrical connection disk 231 equipped with stiffening strips 290 and welding strips 280 acting as electrical connection means.

The stiffening strips 290 have a double function, namely a mechanical rigidity role and the role of electrical conductor for the passage of current. The welding strips 280 are used as electrical connection means in order to create the electrical connection between the coiled electrical energy storage element and the lid 230 or 240.

In addition, as illustrated in FIG. 3, each lid 230, or even 240, includes an electrical connection terminal 239 on its opposite outer face 235 within the main body 210 of the envelope 200.

The latter is of cylindrical revolution form and placed at the centre of the electrical connection disk 231.

Other variants of electrical connection terminals 239 are also possible. They are not limited to the example illustrated in FIG. 3. As non-limiting examples, it is possible to mention screwed electrical connections of the male or female type, rings or indeed indented tapered terminals.

The stiffening strips 290 and the welding strips 280 are distributed angularly in a uniform manner around the electrical connection terminal 239.

Furthermore, the thickness of the different welding strips 280 is calibrated for laser welding by transparency as will be described particularly in relation to FIG. 4. This is of the order of 0.4 to 1 mm and, preferably, of 0.7 to 0.8 mm.

In a variant, creation of the electrical link between the lids 230, 240 and the coiled element is effected by diffusion brazing, in particular by cold diffusion brazing with the addition of gallium. In the case of such a connection by brazing or diffusion brazing, the thickness of the welded zones will preferably be between 0.4 mm and 3 mm.

In an alternative to laser welding by transparency, it will also be possible to create the connection by welding using any other appropriate conventional technique.

Moreover, as illustrated in FIGS. 5b, 6b and 7b, the small collar 232 (or 242 of the lid 230 (or 240) can be extended at each welding strip 280 so that it opens onto the outer face 235 of the disk 231 and forms a lip 238 that allows the creation of a well, such as a well to accommodate an adhesive or any other resin. The connection strips are thus rendered sealed to fluids after their connection, by the addition of a layer of adhesive or of resin over all of their surface.

According to the first embodiment variant illustrated FIG. 3, the lid 230 has an electrical connection disk 231 that is initially flat, and partially stamped according to at least one profile that corresponds generally with a radius created from axis X-X to form at least one radial rib constituting a welding strip 280 in the form of at least one convex boss 281 inside the main body 210 of the envelope 200. According to FIG. 3, four such bosses 281 are this distributed around axis X-X. In this case the stiffening strips 290 are formed by a circular sector contour between two welding strips 280.

As can be seen by studying FIG. 4, on the inner face 234 of the electrical connection disk 231, the profile of each boss 281 acts as a bearing surface for the coiled electrical energy storage element.

As can be seen on FIG. 22, a layer of adhesive resin 282 can be provided on the welding strip 280.

More precisely, the current collecting part of the coiled electrical energy storage element, which is concave toward the inside of the element, engaged in a complementary manner with the different bosses 281 of the lid 230 to which it is then connected electrically by welding along the profiles of the latter.

As illustrated in FIG. 5a, the bosses 281, of parabolic or trapezoidal cross section, are preferably distributed angularly in a uniform manner around axis X-X of the electrical connection terminal 239.

They extend, lengthways, radially in relation to axis X-X and open onto the outside of the disk 231.

Other embodiment variants of the lids 230 and 240 illustrated in FIGS. 6 and 7, specify a lid that includes an electrical connection disk 231 with a flat inner face 234 and an outer face 235 with stiffening strips 290 and welding strips 280.

FIG. 6 illustrates a variant in which stiffening strips 290 take the form of radial ribs 292 in relation to axis X-X and opening onto the outside of the disk 231.

In a non-limiting example of the invention, these form a four-branched cross on the outer face 235 of the disk.

The stiffening strips 290 alternates with welding strips 280 in a circular sector shape, of low thickness, which extend in width over a minimum distance of 1 to 3 mm.

FIG. 7 illustrates another variant in which welding strips 280 take the form of radial recesses 283 in relation to axis X-X (four recesses 283 distributed evenly around axis X-X, as in FIG. 7, but this example is not limiting in any way) while the remainder of the disk 231, with its main thickness, takes the form of a series of stiffening strips 293 each with the geometry of one sector of a cylinder.

These recesses 283, of substantially rectangular straight section, distributed uniformly over the disk 231 extend radially and open onto the outside of the disk 231.

The embodiment variants of lid 230 or 240 with one disk 231 having a flat inner face 234 can be accompanied by one or more connection straps 295, illustrated in FIG. 9, in order to create the electrical link between the lid 230 or 240, within the main body 210 of the envelope 200, and the current collecting part of the coiled electrical energy storage element.

This electrical connection strap 295 comes for example in the form of a rectangular part with a flat outer face 296 and an inner face 297 with a boss 298 extending over its length.

The boss 298, of parabolic or trapezoidal section for example, will engage on the convex side with the element of the coiled electrical energy storage element that is embossed in a complementary manner, and will be attached to it by a welding process.

In a variant, the electrical connection strap 295 comes in the form of a star that groups together several parts with bosses 298 that are organised radially around the centre of the star.

However, in the case in which the lid 230 or 240 with the flat inner face 234 is used without the small connecting strap 295, the coiled electrical energy storage element should preferably have flattened current collecting elements at its two ends that are parallel to the inner face 234 of the electrical connection disk 231 in order to create a large continuous bearing surface during the electrical connection between the lid 230 or 240 and the coiled element.

According to another embodiment variant of the lids 230 and 240 illustrated in FIG. 8, in order to weld all the turns of the coiled electrical energy storage element, even though these turns are not all on a given radius, provision is made for several series of bosses 284 of substantially rectangular straight section, distributed angularly in a uniform manner on the lid 230, and covering variable radial extensions on the surface of the lid 230.

More precisely, according to FIG. 8, the bosses 284 are divided into two series 285 and 286. More precisely still, according to FIG. 8, provision is thus made for a first series of radially internal bosses 285 (four bosses 285, for example) distributed angularly in a uniform manner around axis X-X, and a second series of radially external bosses 286 (also four bosses 286, for example) that alternate with bosses 285, and are also distributed in an angular fashion.

These bosses 284 are preferably as described in relation to FIGS. 3 to 5.

In an embodiment illustrated in FIG. 18, which can be understood from the description alone, it is possible to insert, between the current-collecting elements 710 and the inner part of the lid 230, at least one thin layer 720 or possibly several thin layers 720, 722 of conducting metal sheeting that covers at least the surface lid to collecting element connection strips. This thin sheet 720 is added in order to compensate for any lack of connection material during the welding of the lid onto the current-collecting elements.

In another variant of the same type, the thin metal sheet can be created in the form of a star whose branches cover the surface of the lid-current-collecting element connection strips (FIG. 19).

Finally, if experience shows that it is desirable, it will be possible to add several layers of thin metal sheeting capable of supplying a large quantity of connection material without the need to provide a large amount of energy for the weld.

Another method, forming an integral part of the invention, of supplying connection material could be to effect material spraying onto the current-collecting elements of the coiled energy storage element in order to improve contact between the said elements and the lid or the intermediate connection part. Such material is illustrated under reference 730 in FIG. 20.

In all of the cases described above, the connection strips of the current-collecting elements can be effected by radial layering of the current-collecting elements from the centre to the outside of the coiled energy storage element, in order to increase the contact area between the said elements and the lid or the intermediate connection part.

In addition, as illustrated in FIGS. 10a and 10b, according to an embodiment variant of a system 100 according to the invention, the main body 210 of the envelope 200 is equipped with at least one anti-opening bellows 225, with a view to preventing a rise of internal pressure during the ageing of the electrical energy storage system 100 and, particularly the generation of gas.

Each bellows 225 is formed, for example, of an annular rib 226 covering the whole circumference of the cylinder 211.

The bellows 225 is calibrated, in form and dimensions, to allow the cylinder 211 to extend, by expansion, under the effect of the rise of internal pressure, while still maintaining its seal.

The extension of the cylinder 211, as illustrated FIG. 10b, causes electrical disconnection between the coiled electrical energy storage element and the associated lid 230 due to the fact that the coiled electrical energy storage element itself cannot extend.

The rupture of the electrical link brings to a stop the ageing phenomenon that is at the origin of the pressure rise.

The electrical energy storage system 100 is thus mad secure by being switched to an open circuit.

In a variant, such an anti-opening safety bellows 225, acting in the event of high internal pressure, can be placed on a lid 230 or 240 between the bonding zone of the lid and the interior of the latter.

Finally, as shown in FIG. 16, an enhancement to the invention enables the addition of a central tubular canal 150 placed within the spool of the coiled energy storage element, the said canal 150 opening out right through at least one of the lids 230, 240, to allow the circulation of a heat-bearing fluid for use in thermal regulation of the system.

This central canal 150 can take the form of hollow aluminium tube 152, attached to one of the two lids 230 or 240, and affixed to the other lid, by bonding with bonding means to a small central collar 151 belonging to said other lid with bonding means 153. In a variant, the tube 152 can be independent of each lid but affixed to a small collar fitted to each lid.

A method for the embodiment of a system for the storage of energy electrical 100 according to the invention is now described in relation to FIG. 12.

In a first step 810, the current collecting elements of the coiled electrical energy storage element are prepared so as to create the electrical link between the element and the type of lid 230 and 240 chosen to close off the main body 210 of the envelope 200.

More precisely, if the lids 230 and 240 include an electrical connection disk 231 with bosses 281 as described in relation to FIGS. 3 to 5, then the current collecting elements of the element are embossed in a complementary manner to these bosses 281, while if the lids 230 and 240 have an electrical connection disk 231 with a flat inner face 234, then the current collecting elements are flattened parallel to this inner face 234.

Furthermore, if connection straps 295 are used, these are welded to the embossed current collecting elements of the coiled electrical energy storage element during step 820, with the current-collecting elements being folded back, or not, by radial layering from the centre to the outside of the coiled element.

Next, at step 830, the coiled electrical energy storage element is inserted into the cylinder 211, which has been pre-fitted with the positioning gaskets 510 and 520 at its two opposite ends 212 and 213.

It is then centre and blocked within the cylinder 211 by a central shrinkage operation on the latter (step 840).

The two lids 230 and 240 are then placed respectively at the two opposite ends 212 and 213 of the cylinder 211 at step 850.

In step 860, the electrical link is then created between the lids 230 and 240 and the coiled electrical energy storage element by transparency laser welding of the current collectors of the element onto the welding strips 280 of each lid 230 and 240 with which they are held contact by pressure.

At step 870, a bonding height 600 is deposited one or other of the annular channels 236 and 246 and surmounts the corresponding positioning gasket 510 or 520.

The system 100 is then raised to a certain temperature in order to cure the adhesive 600, using techniques that in themselves are familiar. It is possible to mention, as non-limiting examples, a curing process either at to ambient temperature or at high temperature, in a general manner by the use of an oven or, in a local manner by means of a ring heated by induction or infra rouge, or by UV, or any other equivalent means.

Step 870 is repeated for the second lid 230 or 240 in a similar manner.

We thus obtain a system for the storage of energy 100 according to the invention.

In an embodiment variant of this method, a pre-bonding process is effected at step 825, on one of lids 230 or 240 at one end 212 or 213 of the main body 210 of the envelope 200, pre-fitted with the positioning gaskets 510 and 520 before insertion of the coiled energy storage element into the cylinder 211 at step 830.

The following steps remain identical to those described previously, except that the final bonding step 870 now concerns only the bonding of the second lid 230 or 240 to the cylinder 211.

In a third embodiment variant of this method, the step 870 for affixing the different lids 230 and 240 to the cylinder 211 is effected before the step 860 for welding of the lids 230 and 240 to the coiled electrical energy storage element.

In this case, the bonding, at one and then the other end of the main body 210 of the envelope 200, is accomplished by holding the two lids 230 and 240 under pressure onto the current collecting elements of the coiled electrical energy storage element, with a view to maintaining optimal contact before welding the element to each of the lids 230 and 240.

In addition, an embodiment variant of an electrical energy storage system 100 according to the invention provides for the use of a cylinder 211 that is equipped with a solid bottom in the form of a lid.

In this case, step 840 for central shrinkage of the main body of the envelope is deleted. The coiled electrical energy storage element connected mechanically to the cylinder 211 then remains floating before the welding step 860.

Furthermore, an operation for affixing a lid is deleted at step 870.

In a fourth embodiment variant of the method, laser welding by transparency allowing creation of the electrical link between the coiled energy storage element and the lids 230 and 240 is replaced by a brazing/diffusion method, such as Gallium brazing/diffusion.

In this method, a deposit of gallium is placed on the inner face of each lid 230 and 240 and brought into contact with the current collecting elements of the element. The whole is then brazed in order to effect the electrical connection of the different elements.

It should be noted that the embodiment of this method requires the use of positioning gaskets 510 and 520 that are resistant to the brazing/diffusion temperatures.

This method for the assembly of an energy storage element can be adapted to be used for the creation of an electrical energy storage module 110 such as that which will now be described in relation to FIGS. 13 to 15.

FIG. 13 illustrates the association of two electrical energy storage systems 100 forming an electrical energy storage module 110.

Each of the electrical energy storage systems 100 is as described previously in relation to FIGS. 1 and 2.

However, at a given end of each of their respective cylinders 211*a* and 211*b*, the two systems 100 enclose their coiled electrical energy storage element 700 by virtue of an electrical common connecting part 900 with two conducting lids 230*a* and 230*b*, each intended to be attached to one of the electrical energy storage systems 100.

This part 900 is thus used in order to create the electrical link between the two juxtaposed electrical energy storage systems 100.

As illustrated in FIG. 14, the part 900 is in the form of a plate 910 that includes, respectively at each of its ends 911 and 912, an electrical connection disk 231*a* and 231*b* equipped on its circumference with a small collar 232*a* and 232*b*, and central strap 920 that connects the two disks 231*a* and 231*b*.

Returning to FIG. 13, the outer face 914 of the plate 910 is flat, while the inner face 915 of the plate 910, which engages with a main body 210 of each envelope 200*a* and 200*b* has the two small collars 232*a* and 232*b*.

The main body 210 of the envelope 200 of each of the two electrical energy storage systems 100 of such a module is attached to this part 900 and, more precisely, each to one of the lids 230*a* and 230*b* of the plate 910 by a positioning gasket 500/bonding element 600 assembly.

In a embodiment example in which an electrical energy storage module 110 with two systems 100 is intended to be functional alone, the two lids 240*a* and 240*b*, which are independent of each other and opposite to the twin-lidded plate 910, connected by electric welding, within the envelope 200, to the two spooled electrical energy storage elements, each having an electrical connection terminal 239 on its outer face.

In order to form a module 110 with more than two spooled electrical energy storage elements, as illustrated in FIGS. 15*a* and 15*b*, the electrical chaining of the systems 100 is effected by means of the plates 910.

According to FIG. 15*b*, these plates 910 are placed alternately as the upper twin lid and then the lower twin lid of the main body 210 of the envelope 200 of pairs of juxtaposed electrical energy storage systems 100.

Thus, in order to create a module of n spooled electrical energy storage elements associated in series, where n is equal to or greater than 3, the systems 100 will be connected together in pairs by means of n-1 connecting parts 900 (twin lids). The connecting parts 900 (twin lids) are provided successively at opposite ends of the energy storage systems 100, where the systems placed at the ends of the series chain constituting the module are connected to the external application by means of individual lids 230, 240.

Conversely, if it is desired to create a module 110 of n electrical energy storage systems 100 in a parallel association, with n being equal to or greater than 2, then all the isopotential ends of the systems will be connected together at a given end by a single lid with as many connection means (small collar 232, 242, positioning gasket 510, 520, or bonding element 610, 620), as there are systems to be connected in parallel.

Finally, if it is desired to create a module 110 with at least one combination of series connected or of parallel connected systems 100 or a group of systems 100, then those skilled in the art will be able to adapt in the required number of single lids 230, 240 and of connecting parts 900 (twin lids), combined together so as to allow the said series or parallel connection of the said systems 100 or groups of systems 100.

A system 100 provided at one end of the module 110 has a main body 210 that is closed at one end 213 by a lid 240 equipped with an electrical connection terminal 239, with this terminal being used as either of the output connections of the electrical energy storage module 110.

At the opposite end 212, the same main body 210 is closed off by either of the lids 230 of a plate 910, with the other lid 230 of the same plate 910 closing off the main body 210 of the envelope 200, at the same end 212 of a juxtaposed system 100.

This system 100 is itself connected to another juxtaposed system 100 by another twin-lidded plate 910 placed at the opposite end of the first plate 910 and so on.

On the last electrical energy storage system 100 of the module 110, the second electrical connection terminal 239 used as the second of the two output terminals of the module 110, is placed on a lid 240.

The advantage arising from this module configuration 110 is removal of the connecting parts between the different electrical energy storage systems 100.

Furthermore, the welding steps are reduces, since there remains only that of the twin-lidded plates 910 onto the spooled electrical energy storage elements.

Those skilled in the art will appreciate a system 100 for the storage of electrical energy that offers simple and reliable configuration, created by bonding, while still proposing a precise and effective electrical connection.

Furthermore, in relation to the known devices of the prior art, this system has a sealing system that is resistant to very high internal pressures and whose adjustable seal attains values below $10^{-9}$ mbar·l·s$^{-1}$.

In addition, this system 100 for the storage of electrical energy offers the advantage of achieving savings in terms of cost, time, and space.

Finally, the present invention is not limited to supercapacitors, and can be implemented for any assembly for the large-scale storage electrical energy. One might mention generators, batteries or capacitors, as non-limiting examples.

The present invention is naturally not limited to the particular embodiments that have just been described, but extends to any variant that complies with its spirit. In particular, the present invention is not limited to the appended drawings. The specific references illustrated in the preceding paragraphs are non-limiting examples of the invention.

The invention claimed is:

1. An electrical energy storage system comprising:
   at least one coiled electrical energy storage element placed within an envelope, said envelope enclosing the coiled electrical energy storage element in a main body of the envelope and having at least one lid,
   wherein said lid, placed at one end of the main body of the envelope and connected electrically by electrical connection means to the coiled electrical energy storage element, is attached to the main body of the envelope by a bonding element,
   wherein the main body of the envelope is in the form of a cylinder centered on a central axis, the lid is in the form of a disk placed perpendicularly to said central axis and including along its outer periphery a collar formed of a cylindrical skirt centered on said central axis, and the external diameter of the disk forming the lid is greater than the external diameter of the cylinder forming the main body of the envelope so that said collar provided on the lid is placed outside an external face of a wall of the cylinder forming the main body of the envelope,
   an annular channel formed between the external face of the wall of the main body of the envelope and an inner face of the collar of the lid,
   a positioning gasket made from an electrically non-conducting material being provided together with said bonding element in said annular channel,
   the bonding element being an electrically insulating adhesive compound which extends in contact from the external face of the wall of the main body of the envelope to the collar of the lid so as to affix the main body of the envelope to the lid, said bonding element being placed on an outside portion of the positioning gasket in relation to a path leading from an internal volume of the envelope on an outside of the envelope and passing through the annular channel formed between the external face of the wall of the main body of the envelope and the collar of the lid, the positioning gasket extending also in contact from the external face of the wall of the main body of the envelope to the collar of the lid so that said positioning gasket prevents the bonding element from entering into the envelope in order to avoid damaging the coiled electrical energy storage element.

2. The system according to claim 1, wherein the collar of the lid is a double collar, which forms a channel in which is placed one end of the cylinder forming the wall of the main body of the envelope.

3. The system according to claim 1, wherein the electrically insulating adhesive compound is sealed to gases and fluids.

4. The system according to claim 1, wherein the electrically insulating adhesive compound is a heat-cured epoxy type.

5. The system according to claim 1, wherein the at least one lid includes an electrical connection disk equipped with connection welding strips and stiffening strips.

6. The system according to claim 5, wherein a thickness of the lid at the connection welding strips for welding is of the order of 0.4 mm to 1 mm.

7. The system according to claim 5, wherein a thickness of the lid at the connection welding strips for brazing is of the order of 0.4 mm to 3 mm.

8. The system according to claim 5, wherein a thickness of the lid at the connection welding strips for diffusion brazing is of the order of 0.4 mm to 3 mm.

9. The system according to claim 5, wherein the connection welding strips have convex boss shapes directed towards inside the main body of the envelope.

10. The system according to claim 5, wherein the connection welding strips are rendered sealed to fluids after connection by addition of a layer of adhesive or of resin over all of a surface of the connection welding strips.

11. The system according to claim 1, wherein the lid has a flat inner bottom, connection strips being created in the form of recesses on an outer face of the lid.

12. The system according to claim 1, wherein the lid has a flat inner bottom, stiffening strips being formed from ribs in relief on an outer face of the lid.

13. The system according to claim 1, wherein the lid has a flat inner bottom, and an electrical connection between the coiled electrical energy storage element and the lid is created by means of at least one connecting strap placed between the lid, within the main body of the envelope, and a current collecting element of the coiled electrical energy storage element.

14. The system according to claim 13, wherein the connecting strap is a part with a flat outer face that is connected electrically to the lid, and an inner face with a boss connected electrically to the current collecting element of the coiled electrical energy storage element.

15. The system according to claim 13, wherein the connecting strap has a star shape that groups together several parts that have bosses organised radially around a centre of the star.

16. The system according to claim 1, wherein, between current-collecting elements of the coiled element and an inner part of the lid, said system has at least one layer of conducting metal sheeting, covering at least a surface of the connection strips of the lid and the current-collecting elements, and added in order to compensate for any lack of connection material during a welding of the lid onto the current-collecting elements.

17. The system according to claim 16, wherein the layer of conducting metal sheeting is created in a form of a star whose branches cover the surface of the connection strips of the lid and the current-collecting elements.

18. The system according to claim 16, wherein said at least one layer of conducting metal sheeting includes at least two layers of conducting metal sheeting that are adapted for supplying a connection material.

19. The system according to claim 1, wherein said system includes an addition of material onto current collecting elements of the coiled electrical energy storage element by material spraying onto said current-collecting elements.

20. The system according to claim 1, wherein connection strips of current-collecting elements of the coiled electrical energy storage element are created by radial layering of current-collecting elements from a centre to an outside of the coiled electrical energy storage element.

21. The system according to claim 1, further comprising at least one safety bellow adapted to allow the main body of the envelope to expand in response to a rise in internal pressure, said bellows being placed on the main body of the envelope.

22. The system according to claim 1, further comprising at least one safety bellow adapted to allow the main body of the envelope to expand in response to a rise in internal pressure, said bellows being placed on the lid between a bonding zone of the lid and an interior of the lid.

23. The system according to claim 1, further comprising a circular central canal placed within a spool of the coiled energy storage element, with said canal opening out right through the at least one lid, to allow circulation of a heat-bearing fluid for use in thermal regulation of the system.

24. The system according to claim 23, comprising a first and a second lid of the at least one lid wherein the central canal is formed from a hollow aluminium tube attached to said first lid, and affixed to the second lid, so that it fits onto a central collar belonging to said second lid.

25. An electrical energy storage module with n electrical energy storage systems according to claim 1, where n is an integer equal to or greater than 2, each system comprising at least one lid of the at least one lid, wherein the at least two lids closing off the main envelope bodies of the n electrical energy storage systems, wherein the main envelope bodies of at least two of the n electrical energy storage systems are juxtaposed,
  a twin-lidded part, separate from the at least two lids, that is common to the two electrical energy storage systems, where the n systems constituting said module are closed off respectively at opposite ends of corresponding main envelope bodies by the at least two lids and by the twin-lidded part.

26. The module according to claim 25, wherein the twin-lidded part includes a plate comprised of a first lid and a second lid, wherein the first and second lids are connected by a connection strap, with each of the first and second lids are assembled to one of the two main envelope bodies.

27. The module according to claim 25, wherein the n electrical energy storage systems are combined in series, wherein the systems are connected together in pairs by means of n-1 of the twin lidded part, with the twin lidded parts connecting two systems in consecutive pairs, the systems placed at ends of the series combination constituting the module being connected to an external application by means of individual lids of the at least one lid.

28. The module according to claim 25, wherein the n electrical energy storage systems are combined in a parallel, wherein isopotential ends of the systems are connected together at a given end by a lid of the at least one lid in the form of the twin-lidded part that has as many connection means as there are systems to be connected in parallel.

29. The module according to claim 25, including at least one series or parallel combination of the systems or groups of the systems, having multiple twin-lidded parts corresponding to at least four juxtaposed main envelope bodies of the systems that are combined to allow connections in series or in parallel of said systems or groups of systems.

30. A method for making an electrical energy storage system that comprises at least one coiled electrical energy storage element placed within a main body of an envelope, said envelope including at least one lid,
  the main body of the envelope being in the form of a cylinder centered on a central axis, and the lid in the form of a disk including along its outer periphery a collar formed of a cylindrical skirt, the external diameter of the disk forming the lid being greater than the external diameter of the cylinder forming the main body of the envelope,
  wherein said method comprises:
  placing the lid on the envelope such that the collar provided on the lid is outside the external face of the wall of the cylinder forming the main body of the envelope, and such that the cylindrical skirt of said collar is centered on the central axis of the main body of the envelope,
  attaching the lid at one end of the main body of the envelope by a bonding element that coats a positioning gasket inserted between the external face of the wall of the main body of the envelope and the collar of said lid,
  forming an annular channel between the external face of the wall of the main body of the envelope, and an inner face of the collar of the lid,
  providing the positioning gasket made from an electrically non-conducting material together with said bonding element in said annular channel, the bonding element being an electrically insulating adhesive compound which extends in contact from the external face of the wall of the main body of the envelope to the collar of the lid so as to affix the main body of the envelope to the lid, said bonding element being placed on an outside of the positioning gasket in relation to a path leading from an internal volume of the envelope on an outside of the envelope and passing through the annular channel formed between the external face of the wall of the main body of the envelope and the collar of the lid, the positioning gasket extending also in contact from the external face of the wall of the main body of the envelope to the collar of the lid so that said positioning gasket prevents the bonding element from entering into the envelope in order to avoid damaging the coiled electrical energy storage element.

31. The method according claim 30, wherein the attaching is executed before a step for an electrical connection of said lid by electrical connection means to the coiled electrical energy storage element.

32. The method according to claim 30, wherein an electrical connection step includes a step of laser welding by transparency under pressure, of current collecting elements of the coiled electrical energy storage element to welding strips fitted to the lid.

33. The method according to claim 30, wherein an electrical connection step includes a brazing/diffusion step that places a deposit of gallium onto the lid before brazing said lid and current collecting elements of the coiled electrical energy storage element.

34. The method according claim 30, wherein the attaching is executed after a step for an electrical connection of said lid by an electrical connection means to the coiled electrical energy storage element.

\* \* \* \* \*

UNITED STATES PATENT AND TRADEMARK OFFICE
CERTIFICATE OF CORRECTION

| | | |
|---|---|---|
| PATENT NO. | : 8,968,919 B2 | Page 1 of 1 |
| APPLICATION NO. | : 12/086227 | |
| DATED | : March 3, 2015 | |
| INVENTOR(S) | : Olivier Caumont, Rene Huibant and Jean-Francois Minart | |

It is certified that error appears in the above-identified patent and that said Letters Patent is hereby corrected as shown below:

On the Title Page, in Item [54], and in the specification, column 1, please correct the title of the patent at line 2; please delete "BONDINGING" and insert --BONDING--.

Signed and Sealed this
Seventeenth Day of November, 2015

Michelle K. Lee
*Director of the United States Patent and Trademark Office*